United States Patent
Dery et al.

(10) Patent No.: US 6,618,797 B1
(45) Date of Patent: Sep. 9, 2003

(54) DEVICE AND METHOD FOR PROTECTION AGAINST STACK OVERFLOW AND FRANKING MACHINE USING SAME

(75) Inventors: Jean-Marc Dery, Asnieres (FR); Frédéric L'Hote, Paris (FR)

(73) Assignees: Secap, Boulogne-Billancourt (FR); Ascom Autelca AG, Bern-Bumpliz (CH)

( * ) Notice: Subject to any disclaimer, the term of this patent is extended or adjusted under 35 U.S.C. 154(b) by 0 days.

(21) Appl. No.: 09/856,614

(22) PCT Filed: Nov. 23, 1999

(86) PCT No.: PCT/FR99/02884
§ 371 (c)(1),
(2), (4) Date: May 24, 2001

(87) PCT Pub. No.: WO00/31633
PCT Pub. Date: Jun. 2, 2000

(30) Foreign Application Priority Data

Nov. 24, 1998 (FR) .............................. 98 14773

(51) Int. Cl.$^7$ ................................. G06F 11/00
(52) U.S. Cl. .................. 711/170; 711/132; 711/165; 711/171; 711/172; 711/173
(58) Field of Search ............................ 711/132, 165, 711/170–173; 712/202

(56) References Cited

U.S. PATENT DOCUMENTS

| | | | |
|---|---|---|---|
| 5,748,882 A | * | 5/1998 | Huang |
| 5,771,348 A | | 6/1998 | Kubatzki et al. ........... 713/200 |
| 6,012,129 A | * | 1/2000 | Hartner et al. |
| 6,206,584 B1 | * | 3/2001 | Hastings |

OTHER PUBLICATIONS

"Dynamic Stack Management In Multi–Tasking Multi–Threaded Operating Systems", IBM TDB, vol. 34, No. 4b, Sep. 199.*

J. Richter, "Advanced Windows 3$^{rd}$ Edition", 1997, pp. 118–121 and 224–231.

"Dynamic Stack Management In Multi–Tasking Multi–Threaded Operating Systems", IBM TDB, vol. 34, No. 4b, Sep. 1991.

* cited by examiner

*Primary Examiner*—T. V. Nguyen
(74) *Attorney, Agent, or Firm*—Crowell & Moring LLP

(57) ABSTRACT

The invention concerns a method for protecting sensitive data against overflow in a stack, memory space reserved for part of a program. Said method comprises an operation which consists in assigning a stack to each program part, during which the most upstream stack relatively to the displacement direction of an indicator in a stack, is assigned a task for operating on said sensitive data. Preferably, said method comprises the execution of a single task operating on said sensitive data.

6 Claims, 3 Drawing Sheets

DEVICE AND METHOD FOR PROTECTION AGAINST STACK OVERFLOW AND FRANKING MACHINE USING SAME

BACKGROUND AND SUMMARY OF THE INVENTION

"A system for and a method of protection against stack overflow in a memory and a franking machine employing them"

The present invention relates to a system for and a method of protection against stack overflow in a memory and a franking machine employing them.

It applies in particular to franking machines provided with a program executing in a multitasking environment and more generally to protecting sensitive data.

In a franking machine, some tasks use amounts representing sums of money. Correct execution of each of these tasks of a program must be guaranteed. Correct execution means that a task executes in its stack. The stack of a task corresponds to a memory space that is reserved for it. In other words, the invention aims to prevent sensitive data being degraded or modified inopportunely. It is therefore essential to guarantee that no stack overflows outside the memory space that is allocated to it.

There is no certification of no stack overflow of a task in prior art multitasking programs using electronic memories.

To this end, the present invention aims to place the stack including the most sensitive data in the most upstream position in the memory space used for the stacks of the tasks, relative to the direction of movement of a pointer in a stack.

Accordingly, even if another stack overflows, its pointer cannot reach the stack that contains the most sensitive data.

A first aspect of the invention provides a method of protecting sensitive data against overflow of a stack, i.e. of a memory space reserved for a part of a program, characterized in that it includes an operation of allocating stack to each program part, during which operation the most upstream stack, relative to the direction of movement of the pointer in a stack, is allocated to a task operating on said sensitive data.

Accordingly, if another stack overflows, it is in the upstream to downstream direction that data can be disturbed, with no risk of disturbance of the sensitive data.

In particular, the sensitive data can represent sums of money.

According to particular features, said method includes the execution of a single task operating on said sensitive data.

A second aspect of the invention provides a device for protecting sensitive data against overflow of a stack, i.e. of a memory space reserved for a part of a program, characterized in that it includes means for allocating stack to each program part adapted to allocate the most upstream stack, relative to the direction of movement of a pointer in a stack, to a task operating on said sensitive data.

The invention also provides a franking machine characterized in that it includes a device as succinctly described hereinabove.

The invention also provides:

means for storing information readable by a computer or a microprocessor storing instructions of a computer program, characterized in that it enables to implement the method according to the invention as succinctly described hereinabove, and partly or completely removable means for storing information readable by a computer or a microprocessor storing instructions of a computer program, characterized in that it enables to implement the method according to the invention as succinctly described hereinabove.

BRIEF DESCRIPTION OF THE DRAWINGS

The above device, the above franking machine and the above storage means have the same advantages as the method succinctly described hereinabove, which are not described again here.

Other advantages, objects and features of the invention will emerge from the following description, which is given with reference to the accompanying drawings, in

DETAILED DESCRIPTION OF THE DRAWINGS

Figure 1:
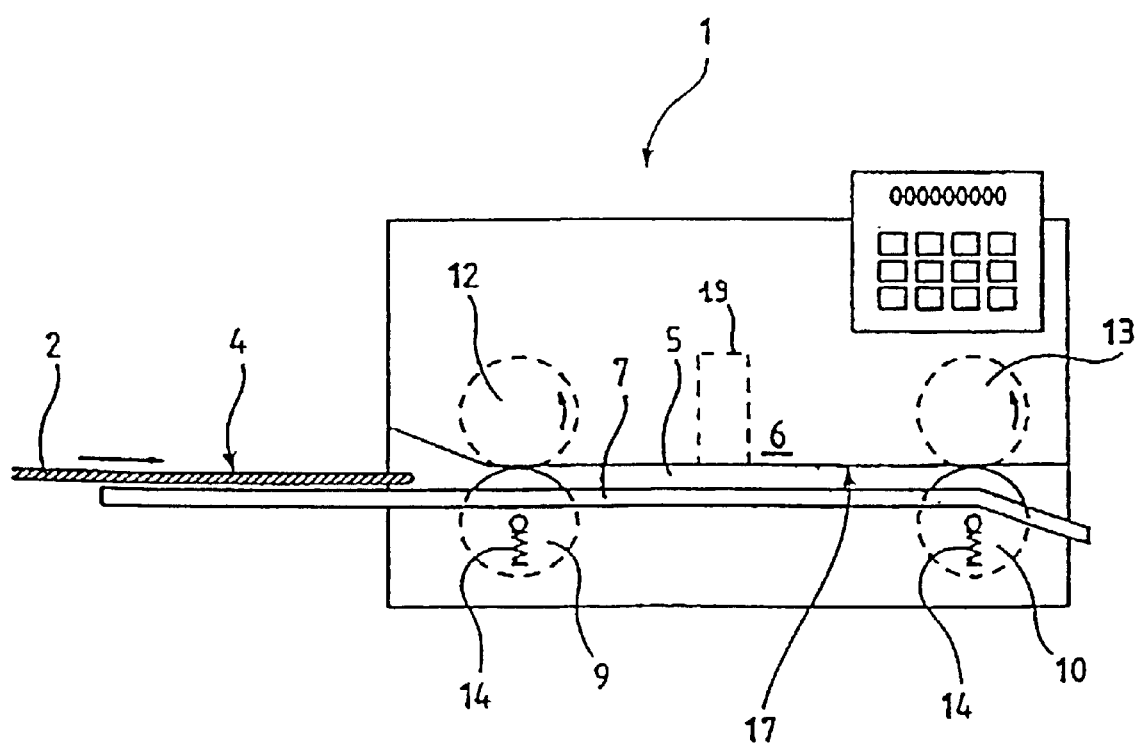
Figure 2:
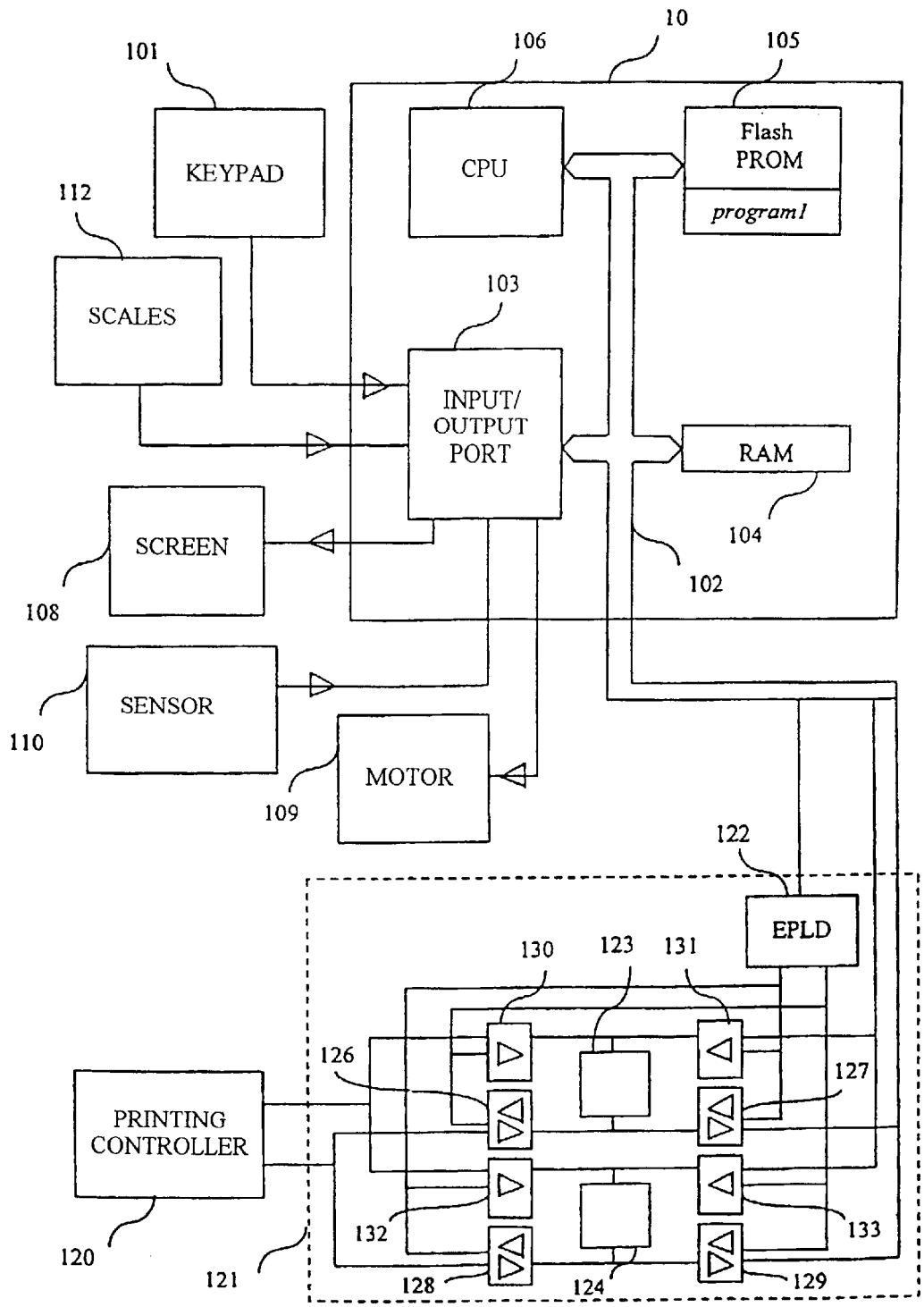
Figure 3A:
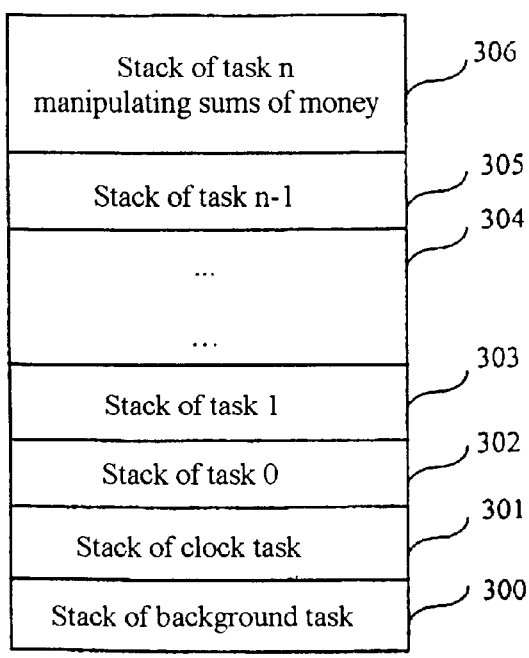
Figure 3B:
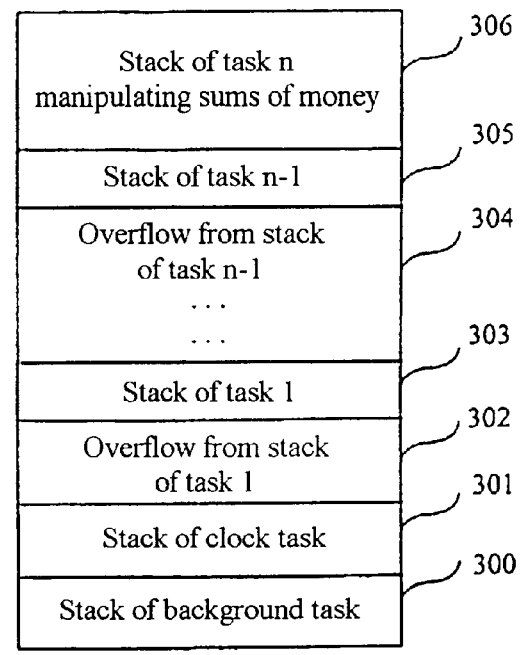

FIG. 1 shows a franking machine employing the stack overflow detection device and method in accordance with the present invention, FIG. 2 is a diagram showing an electronic circuit incorporated in the franking machine shown in FIG. 1, and FIGS. 3A and 3B show a memory organization in accordance with the present invention, respectively before and after a stack overflow.

The franking machine 1 shown in the drawings includes a device for printing a franking mark and an optional destination address of the envelope on a flat object such as a letter 2.

To print the franking mark in the standardized place provided for this purpose, the letter 2 must be passed through a corridor 5 in the machine 1 which is delimited by members fastened to the frame, respectively a sliding support 6 which forms the ceiling of the corridor 5, a table 7 which forms its floor, and a ramp which forms one of its lateral limits. The corridor is open at the end opposite the ramp.

To insert the letter 2 into the corridor 5, the letter is placed on the part of the table 7 which projects on the insertion side (the side seen on the left in FIG. 1), after which the letter is inserted into the corridor 5, as shown in FIG. 1, until it is driven by means provided for this purpose in the machine 1. The franking mark is printed automatically while the letter 2 is driven along the corridor 5, the franked letter being expelled from the machine at the other end of the corridor 5 (the end seen on the right in FIG. 1).

For driving the letter 2, the machine 1 includes two rollers 9 and 10, each passing through an opening in the table 7, and respective pressure rollers 12 and 13 for the rollers 9 and 10, each passing through an opening in the support 6.

The rollers 9 and 10 are mounted so that they can rotate relative to the frame of the machine 1 through suspension means 14 shown diagrammatically in FIG. 1.

The pressure rollers 12 and 13 are mounted on the frame of the machine 1 so that they can rotate but are not suspended from the frame. An electric motor, not shown, is used to drive synchronous rotation of the pressure rollers 12 and 13, for example by means of a belt (not shown) running around three pulleys respectively carried by the motor, the pressure roller 12 and the pressure roller 13.

Because the suspension means 14 urge the rollers 9 and 10 toward the support 6, and therefore toward the pressure rollers 12 and 13, the rollers 9 and 10 are driven by friction against the pressure rollers 12 and 13, either directly or through an object passing through the machine 1, such as the letter 2.

When the letter 2 is inserted into the corridor 5 in the manner shown in FIG. 1, it eventually encounters the roller 9 and then the pressure roller 12, which drives it in the direction indicated in FIG. 1 by the horizontal arrow oriented from left to right. At the same time, the roller 9 is lowered as the letter 2 is inserted between the rollers 9 and 12. The letter 2 therefore moves forward in the machine 1 with its face 4 to be printed pressed against and sliding along the surface 17 of the sliding support 6.

The machine 1 includes printing means 19, shown quite diagrammatically in FIG. 1, for printing the franking mark in its corresponding standardized place and/or the destination address in its corresponding standardized place.

Generally speaking, the printing means 19 apply the franking mark while the letter 2 or the object to be franked is traveling through the machine 1 with its face to be printed pressed against the surface 17 of the sliding support 6, the printing means 19 being located between the pressure rollers 12 and 13.

In the example shown, the printing means 19 are mounted directly on the frame of the machine and are therefore fixed relative to the sliding support 6.

In order for the printing means 19 to be controlled synchronously with forward movement of the object in the machine, a sensor (not shown) is provided to detect the presence of the object and triggers a printing process that is then executed automatically.

To be more precise, a first sensor causes the motor (not shown) to be started when an object begins to be inserted into the machine 1 and a second sensor (not shown) starts the printing process when the object has reached a predetermined location.

FIG. 2 shows an electronic control circuit of the device shown in FIG. 1. The circuit 100 is shown in the form of a block diagram. It includes, connected by an address and data bus 102:

a central processing unit 106,
a random access memory (RAM) 104,
a flash programmable read-only memory (PROM) 105,
an input/output port 103 for receiving:
  the weight of the postal object to be franked, and
  detection of the postal object by each of the sensors (not shown in the drawings), and for transmitting:
    motor control signals, and, independently of the bus 102:
stepper motors 109,
presence detection sensors 110,
a display screen 108 connected to the input/output port 103,
scales 112 connected to the input/output port 103 and supplying bytes representing the weight of a postal object, and
a keypad 101 connected to the input/output port 103 and supplying bytes representing successively pressed keys of the keypad.

Each of the components shown in FIG. 2 is well known to the person skilled in the art of microprocessor circuits and, more generally, information processing systems. Those components are therefore not described here.

The random-access memory 104 stores data, variables and intermediate processing results in memory registers which, in the remainder of the description, carry the same name as the data whose value they store. The random-access memory 104 includes in particular registers storing information representing the weight of the postal object to be franked, the format of the postal object currently being processed, the number of postal objects in the batch currently being processed, up-counter and down-counter values that correspond to franking amounts already applied and remaining to be applied before recharging the machine. The latter registers employ techniques that are known in the franking machine art (during each franking operation, if the down-counter amount is greater than the amount of the franking mark to be applied, it is decremented by the amount of that mark and the up-counter is incremented by the same amount).

The read-only memory 105 is adapted to store the operating program of the central processing unit 106, in a register labeled "program1" and the data needed for the program to execute.

The memory 105 referred to as a "random-access memory" is in fact a rewriteable non-volatile memory (i.e. it is not erased when the system is turned off). It can be rewritten only by authorized personnel using secure procedures, so that for the everyday user it is just like a read-only memory.

The central processing unit 106 is adapted to execute the program stored in read-only memory 105 and to organize the random access memory 104, as shown in FIG. 3A.

The software (program) of the franking machine is multitasking software, which implies allocation by the processor of a memory space (stack) associated with each task in the random access memory 104.

The following table shows, in decreasing memory address order, all of the stacks employed by the program, to according to the prior art:
stack of task n
stack of task n−1
.
.
.
stack of task 1
stack of task 0
stack of clock task
stack of background task Note that the stack pointers move vertically downwards when stacking, reading or writing in the stacks.

It can be easily understood that, if a stack overflows, i.e. if a task writes outside the stack allocated to it, another stack, placed downstream in the vertical downwards direction, is disturbed and the whole of the operation of the franking machine is disturbed.

In the case of franking machines, values stored in the stacks represent "sensitive" values, such as sums of money. It is therefore essential to guarantee that the stacks cannot be violated.

In accordance with the present invention, in the embodiment described and shown:
  the stack which is allocated to the task which manipulates sensitive data, in this instance sums of money, is placed at the highest address, a pointer moving in a stack in the direction of decreasing addresses, and
  a single task manipulates data representing sums of money.

The single task is the one which, during each franking operation, verifies that the amount of the down-counter is greater than the amount of the franking mark to be applied and, if so, decrements the down-counter by the amount of that mark and increments the up-counter by the same amount.

To this end, an operation is effected to allocate a stack to each program part, during which operation the most upstream stack, relative to the direction of movement of a pointer in a stack, is allocated to a task operating on said sensitive data.

The stack start address for each of the other tasks of the application is then fixed.

The following table, corresponding to FIG. 3A, shows, in decreasing memory address order, all of the stacks used by the program, in accordance with the present invention:

stack of task n, manipulating data representing sums of money stack of task n−1

.

.

.

stack of task 1 stack of task 0 stack of clock task stack of background task

For example, the following table, corresponding to FIG. 3B, shows, in decreasing memory address order, all of the stacks used by the program, if the stacks of tasks n−1 and 1 overflow:

stack of task n stack of task n−1 stack of task n−2 including overflow from stack of task n−1

.

.

.

stack of task 1 stack of task 0 including overflow from stack of task 1 stack of clock task stack of background task

Note that there is no risk of the stack overflow reaching the sensitive data, which are in the stack of task n.

What is claimed is:

1. A method of protecting sensitive data against overflow of a stack of memory space reserved for a part of a program, said method comprising the steps of:

allocating a separate stack to each part of a program;

allocating a most upstream stack, relative to a direction of movement of a stack pointer in a plurality of stacks, to a task operating on said sensitive data.

2. A method according to claim 1, further including the step of executing a single task operating on said sensitive data.

3. A device for protecting sensitive data against overflow of a stack of memory space reserved for a part of a program, said device comprising:

means for allocating a separate stack for each program part;

means for allocating a most upstream stack of said plurality if stacks, relative to a direction of movement of a stack pointer in said plurality of stacks to a task operating on said sensitive data.

4. A device according to claim 3, further including a data processing means for executing a single task operating on said sensitive data.

5. The device according to claim 3, wherein said device is a franking machine.

6. The device according to claim 4, wherein said device is a franking machine.

\* \* \* \* \*